Patented Oct. 2, 1928.

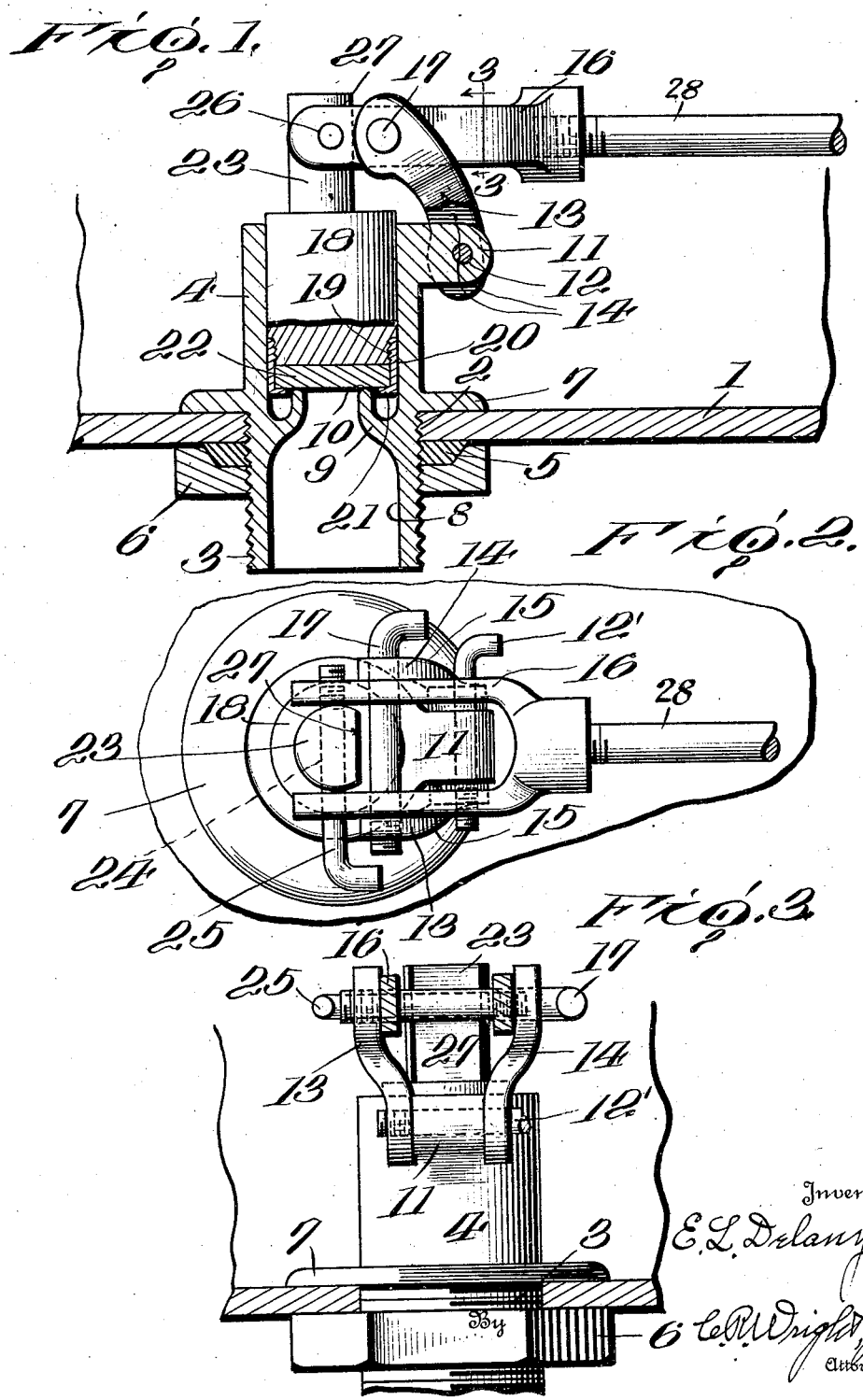

1,685,987

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLOAT VALVE.

Application filed January 17, 1925. Serial No. 3,127.

My invention relates to improvements in float valves.

The object of my invention is to provide a float valve for tanks in which the pivot of the float lever is close to the pivotal connection of the lever with the valve and yet provide for the proper leverage to cause the seating of the valve by the movement of the float lever.

Another object of the my invention is to provide a simple arrangement of the fulcrum lever whereby the necessary sidewise movement is provided for, to prevent the jamming of the lever caused by the float, and at the same time to provide a simple construction whereby any of the parts can be readily replaced when worn.

In the accompanying drawings:

Figure 1 is a vertical sectional view of a flush tank showing my improved float valve applied thereto.

Figure 2 is a top plan view of Figure 1.

Figure 3 is a transverse vertical sectional view taken on the line 3—3 of Figure 1 looking in the direction of the arrow.

Referring now to the drawings 1 represents a flush tank, the bottom of which is provided with an opening 2 through which passes the screw threaded portion 3 of the valve casing 4 and a tight joint is formed therewith by means of the packing 5, and the nut 6 which is the usual structure and which could be varied as this forms no part of this invention. The casing 4 is provided with the usual flange 7 engaging the bottom of the tank.

The casing 4 is provided with the passage 8 therethrough, and the water supply pipe is connected to the lower end of the casing and the water passes through this passage to the tank. Within the passage 8 between its ends is an inwardly and upwardly extending flange 9 having its upper edge rounded as indicated at 10 and forming a seat for the lower end of the valve.

The casing 4 at its upper end is provided with the outwardly extending horizontal lug 11 having an opening 12 therethrough and through which passes the pivot 12' upon which are loosely mounted the links 13 and 14, one on each side of the lug and which are curved outwardly as indicated at 15 and extend on the outside of the yoke 16 and are pivotally connected thereto by means of the pivot 17.

The valve proper, consists of a cylindrical body portion 18 of an elongated form so that the same is free to move longitudinally within the bore 8 of the casing and has its lower end reduced and externally threaded as indicated at 19 and upon which is screwed the sleeve 20 which is provided with the inwardly extending flange 21 adapted to engage the washer 22 and firmly hold it on the lower end of the valve. As shown, this flange extends a very short distance inwardly so that the washer 22 will engage the rounded valve seat 10 and wholly shut off the passage of the water through the passage 8.

The upper end of the valve 18 is provided with an upwardly extending reduced portion 23 having an opening 24 through which passes the pivot 25 which also passes through openings 26, in the outer ends of the yoke 16. The portion 23 has one side cut away as indicated at 27 to allow of the free movement of the links 13 and 14 so that the pivot thereof with the yoke is very close to the pivot 25 of the yoke with the valve.

The yoke 16 has screwed into its outer end the rod 28 carrying the float, all of which is readily understood. The pivots 12, 17 and 25 are preferably made of the form shown, with one end threaded so that they may be readily removed for replacing any worn parts.

Having thus fully described my invention what I claim is:

1. A float valve comprising a casing, a valve therein extending beyond the casing and having one side cut away, a float lever pivotally connected to the valve, and a compensating arm pivoted to the casing and extending upwardly over the valve and pivoted to the float lever very close to the pivotal connection between the float lever and the valve.

2. A float valve comprising a casing, a valve therein and extending beyond the casing and having one side cut away, a float lever pivotally connected to the valve, and a compensating arm pivoted to the casing and extending upwardly and inwardly over one side of the valve, and pivoted to the float lever close to the cut away portion of the valve, bringing the fulcrum point of the lever and its connection with the valve very close together.

In testimony whereof, I have signed this specification.

EDWARD L. DELANY.